United States Patent [19]

Knechtle et al.

[11] 4,208,460

[45] Jun. 17, 1980

[54] PROCESS FOR PRODUCING PAPER HAVING A COATING OF PRESSURE-SENSITIVE TRANSFER COPYING MATERIAL

[75] Inventors: Bruno Knechtle, Herisau; Paul Dähler, Lichtensteig, both of Switzerland

[73] Assignee: Blockfabrik Lichtensteig, AG, Lichtensteig, Switzerland

[21] Appl. No.: 853,546

[22] Filed: Nov. 21, 1977

Related U.S. Application Data

[63] Continuation of Ser. No. 726,112, Sep. 24, 1976, abandoned.

[30] Foreign Application Priority Data

Sep. 29, 1975 [CH] Switzerland ....................... 12574/75

[51] Int. Cl.$^2$ .......................... B32B 7/14; B41M 5/16

[52] U.S. Cl. .................................. 428/195; 282/27.5; 427/8; 427/150; 427/151; 427/152; 427/288; 427/391; 428/211; 428/537; 428/914; 427/398.2

[58] Field of Search ................................ 427/150–152, 427/146, 288, 391, 398 A, 8; 428/195, 201, 207, 211, 411, 537, 913, 914; 282/27.5

[56] References Cited

U.S. PATENT DOCUMENTS

| | | | |
|---|---|---|---|
| 1,845,260 | 2/1932 | Francoise | 427/398 A |
| 3,016,308 | 1/1962 | Macaulay | 428/307 |
| 3,079,351 | 2/1963 | Staneslow et al. | 428/307 |
| 3,442,682 | 5/1969 | Fukawa | 428/411 |
| 3,723,169 | 3/1973 | Guastella et al. | 427/398 A |
| 3,914,511 | 10/1975 | Vassiliades | 427/150 |
| 3,975,559 | 8/1976 | Paulson et al. | 427/150 |
| 3,996,405 | 12/1976 | Porter | 427/150 |
| 4,021,059 | 5/1977 | Skelly | 427/150 |
| 4,023,830 | 5/1977 | Skelly | 427/150 |
| 4,051,303 | 9/1977 | Hayaski et al. | 427/150 |
| 4,063,754 | 12/1977 | Shackle et al. | 427/150 |
| 4,085,237 | 4/1978 | Kawakami et al. | 427/150 |

*Primary Examiner*—Ronald H. Smith
*Assistant Examiner*—Janyce A. Bell
*Attorney, Agent, or Firm*—Larson, Taylor & Hinds

[57] ABSTRACT

A process is described for continuously producing paper having a coating of dyestuff donor mass for reaction with a dyestuff acceptor mass. A web of the paper passes between a printing block surrounding a roller and a donor mass transfer roller whereby the paper is partially coated on one face with the donor mass. The transfer roller receives the donor mass from a system by which the viscosity of the mass is kept constant by a viscosity measuring device controlling the supply of solvent to the donor mass. The coated paper proceeds over a cooling roller, through a drying tunnel in which it is subjected to streams of hot air, and a further cooling roller. The dyestuff donor mass is thereby dried and consolidated and the paper continues through a printing device whereby text is printed onto the paper. The process can be used in the production of a transfer copying set comprising an upper sheet bearing a text on its upper face and a dyestuff acceptor mass over the whole of its lower face, one or more intermediate sheets partially coated on top with donor mass and wholly coated beneath with acceptor mass, and a lower sheet partially coated on top with donor mass.

7 Claims, 2 Drawing Figures

PROCESS FOR PRODUCING PAPER HAVING A COATING OF PRESSURE-SENSITIVE TRANSFER COPYING MATERIAL

This is a continuation, of application Ser. No. 726,112 filed Sept. 24, 1976, now abandoned.

FIELD OF THE INVENTION

The present invention relates to a process for producing paper having a coating of pressure-sensitive transfer copying material and to paper obtained according to this process.

DESCRIPTION OF THE PRIOR ART

Transfer copying systems are known which are based on chemical reactions of dyestuffs. In such transfer copying systems, two superposed sheets of paper forming a transfer copying set are each provided with a coating on the face contacting the other paper sheet, each of the coatings containing a component of a dyestuff, one surface comprising a coating of a dyestuff donor material and the other surface having a coating of a dyestuff acceptor material. The coating of dyestuff donor in most cases consist of organic compounds encapsulated in microcapsules and, under the effect of pressure, a part of the dyestuff donor reacts with the dyestuff acceptor by local colouration.

Such microcapsule paper however has the disadvantage that its production must be effected in several steps in factories specialized in this kind of work and can only be effected on the whole surface of the paper. There is however, naturally, a considerable demand for partially coated paper of this kind, for example for the production of printed forms in which only certain selected portions should be provided with the transfer copying materials.

SUMMARY OF THE INVENTION

It is one purpose of the present invention to provide paper partially coated with pressure-sensitive transfer copying material which has the advantages of the known chemical reaction transfer copying systems without the above-mentioned or other disadvantages.

According to the invention, a process for producing paper having a coating of pressure-sensitive copying material comprising a dyestuff donor mass for reaction with a dyestuff acceptor mass in forming a colour, comprises feeding a length of paper continuously and in sequence through means that partially coat one face of said paper with a dyestuff donor mass and means that dry and consolidate said dyestuff donor mass, and subsequently applying a printed text to said paper.

The present invention also relates to paper produced according to this process the upper face of which is coated with the dyestuff donor mass and printed with text.

The length of paper to be coated partially with the dyestuff donor mass on its upper face according to the present invention may be coated with the dyestuff acceptor mass on its lower face over the whole surface on at least part of its length.

DESCRIPTION OF THE DRAWINGS

An example of the process of the present invention will be described hereinafter in more detail with reference to the accompanying drawings wherein, merely diagrammatically:

Referring to FIG. 1, a length of paper 1' coming from a supply roller 1 is fed to a coating device over guide rollers 2, 3. The coating device consists of a tub 4 containing a dyestuff donor mass in which a roller 5 is partially immersed. The tub is connected with a storage container 7 by a pipeline 6, dyestuff donor mass being continuously delivered from the storage container 7 into the tub 4 by means of a pump (not shown). The dyestuff donor mass in the storage container 7 is kept at constant temperature by means not shown. By means of a measuring device 8, the viscosity of the mass in the storage container 7 is measured continuously and kept constant by supplying solvent from a container 9 through a pipe 10 upon need. As solvent, a mixture of toluene and ethyl alcohol is used. The immersed roller 5 transfers the mass from tub 4 onto a transfer roller 11 from which it is transferred onto the paper 1' when passing over a printing block 13, applied to a roller 12. By means of the printing block 13 made of plastic material, the paper is partially coated with the dyestuff donor mass. The length of paper 1' is now guided over a roller 14 in the interior of which a cooling medium circulates and over guide rollers 15, 16, 17 in a drying tunnel 18. In the latter in the space above the length of paper 1', there is a horizontal plate 19 with a plurality of nozzles 20. Hot air is blown into a pipe 21 opening into the top of tunnel 18 from a source not shown, the air flowing onto the length of paper 1' through the nozzles 20 and effecting rapid drying of the applied dyestuff donor mass. Through a pipe 22 ending in a lateral wall of tunnel 18, the drying air is removed by means of suction fan 23.

After leaving the drying channel 18, the length of paper 1' passes over a further roller 24 in which a cooling medium circulates, and over a guide roller 25 into a printing device 26 by means of which text is printed onto the paper by book printing, or dry or wet offset printing. Thereafter, the length of paper 1' is wound up into a roll 1".

Figure 1:
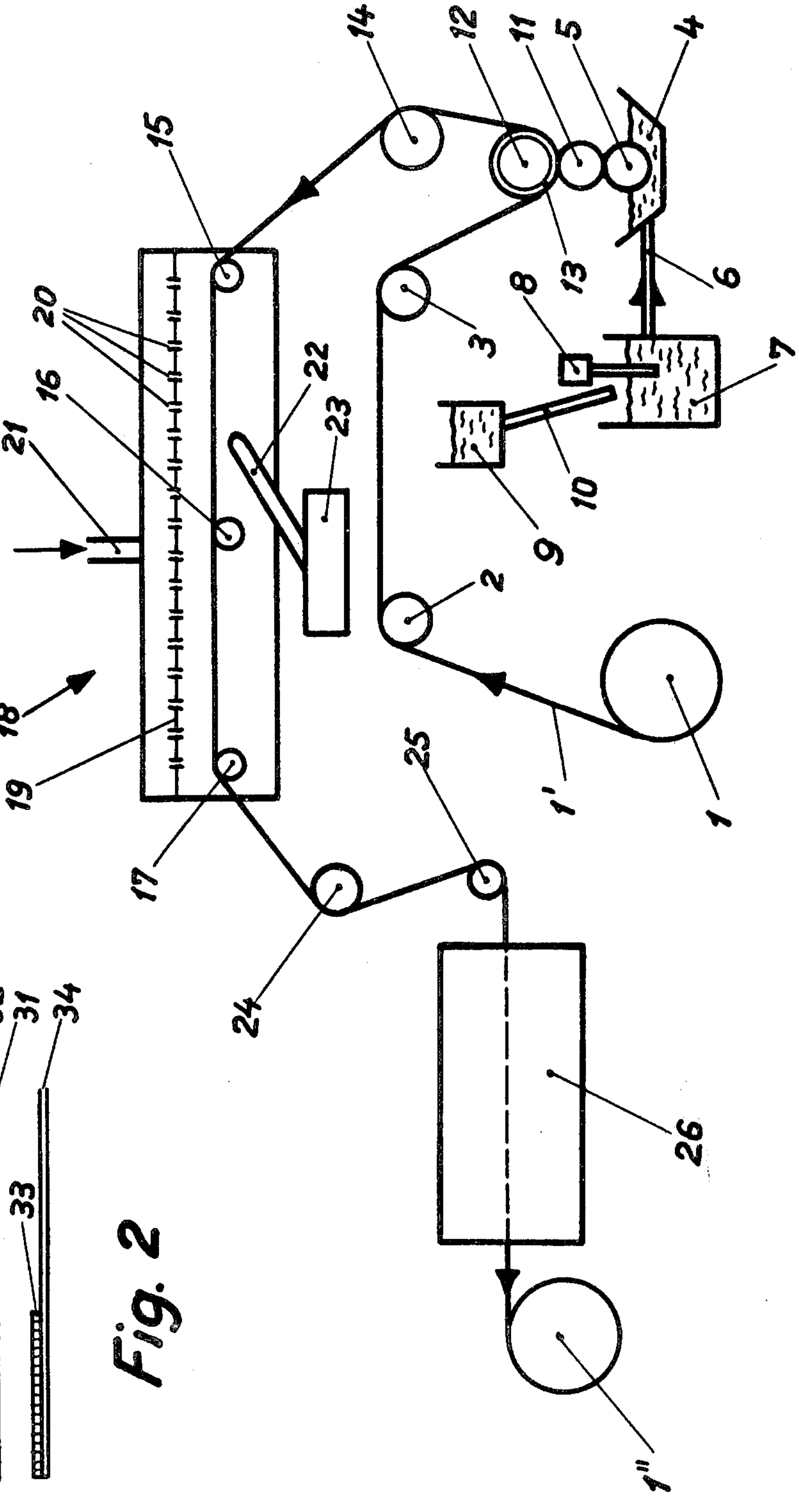
FIG. 1 shows a plant for effecting the process of the present invention.
Figure 2:
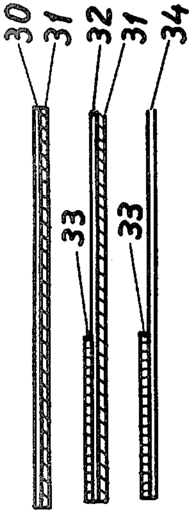
FIG. 2 is a sectional elevation of a portion of a transfer copying set.

The thus treated length of paper can now be cut into individual sheets which, depending on whether their face is coated with dyestuff donor mass or not, may be used as intermediate sheets or as lowermost sheets for transfer copying sets comprising a plurality of sheets. Such a transfer copying set comprises, as shown in FIG. 2, an upper sheet 30 which has only text on its upper face and is coated on the whole of its lower face, with the dyestuff acceptor mass 31, one or several intermediate sheets 32 which are coated, on their upper face, partially with the dyestuff donor mass 33 and on the whole of their lower face with the dyestuff acceptor mass 31 and a lowermost sheet 34 which is coated partially on its upper face with the dyestuff donor mass 33.

As dyestuff donors, the dyestuff pre-products usual for this purpose, such as cristal violet lactone, malachite green lactone, benzoyl leucomethylene blue, rhodamine beta lactam or leuco auramine, can be used. The dyestuff donors may be dissolved preferably in a mixture of toluene and ethyl alcohol, as indicated above, or alternatively in toluene or other organic solvents such as isopropanol together with suitable binders, for example those on the base of vinyl polymers or copolymers. With these solvents, undesired discolourations of the coatings of the dyestuff donor mass can be avoided.

Furthermore, with these solvents the printing block 13 for partially coating the dyestuff donor mass, which consists of synthetic polymer material, does not swell and keeps its dimensions also when used for an extended period of time. Because of the volatility of these organic solvents, the viscosity of the dyestuff donor mass may change easily. It is therefore highly desirable to measure the viscosity of this mass continuously and to keep it constant by addition of solvent.

As dyestuff acceptors, for example those on the base of attapulgite, zeolite, kaolin, phenolic resins as well as of phenol compounds having free reactive phenol groups in combination with binding agents may be used.

The process of the present invention has various advantages. Above all, it renders possible partial coating with the dyestuff donor mass in selected zones of the intermediate and lowermost sheets of transfer copying sets comprising a plurality of sheets. Furthermore, the continuous partial coating of whole lengths of paper with the dyestuff donor mass results on a decisive increase of production speed in comparison with the discontinuous sheet-wise coating usual up to now and therefore a considerable reduction of the cost of production.

We claim:

1. A process for continuously producing paper having a coating of pressure-sensitive copying material comprising a dyestuff donor mass for reaction with a dyestuff acceptor mass in forming a color and a printed text, the process comprising feeding a length of paper continuously and in sequence through means that partially coat in the absence of any water one face of said paper with a solution of a binder and a dyestuff donor mass dissolved in an organic solvent selected from the group consisting of toluene or mixtures of toluene and ethyl alcohol or propyl alcohol, continuously controlling the viscosity of the solution of said dyestuff donor mass and binder during said feeding and further supplying solvent upon need, drying said coating by heating and cooling said coating to consolidate said dyestuff donor mass and continuously applying a printed text on the same face of said paper at the same speed.

2. A process according to claim 1, in which said organic solvent is toluene.

3. A process according to claim 1, in which said organic solvent is a mixture of toluene and ethyl alcohol.

4. A process according to claim 1, wherein said length of paper, subsequently to being fed through said coating means, is guided through a drying tunnel and subjected to hot air in said tunnel, and is fed over a cooling roller, said drying tunnel and cooling roller constituting said drying and consolidating means.

5. A process according to claim 1, in which said length of paper, prior to feeding through said coating means, is constituted by a length of paper printed over at least part of its length on the whole of the face of said part, opposite to said one face of said paper, with a dyestuff acceptor mass.

6. The paper product produced by the process of claim 1.

7. Paper according to claim 6, printed on the whole of the opposite face thereof with a dyestuff acceptor mass.

* * * * *